Aug. 18, 1931.   K. DAVIS   1,819,995
MECHANISM AND PROCESS OF SEPARATING INTERMIXED DIVIDED MATERIALS
Filed May 21, 1924   5 Sheets-Sheet 3
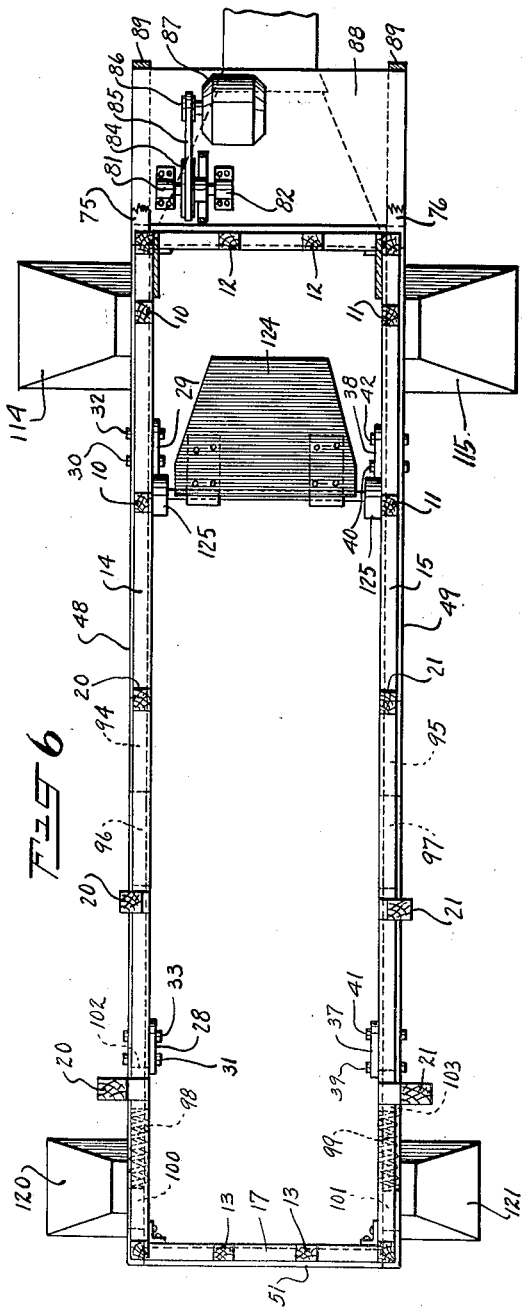
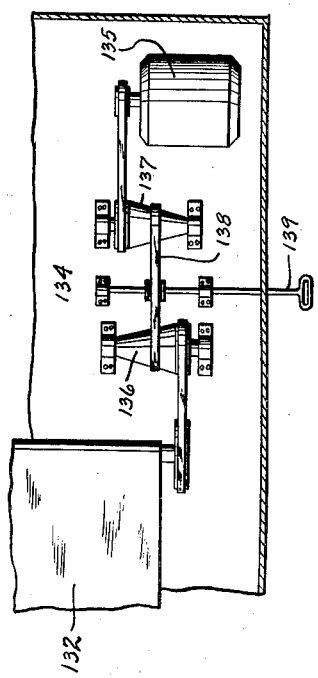
INVENTOR
K. Davis
BY John D Morgan
ATTORNEY Aug. 18, 1931.  K. DAVIS  1,819,995
MECHANISM AND PROCESS OF SEPARATING INTERMIXED DIVIDED MATERIALS
Filed May 21, 1924  5 Sheets-Sheet 4
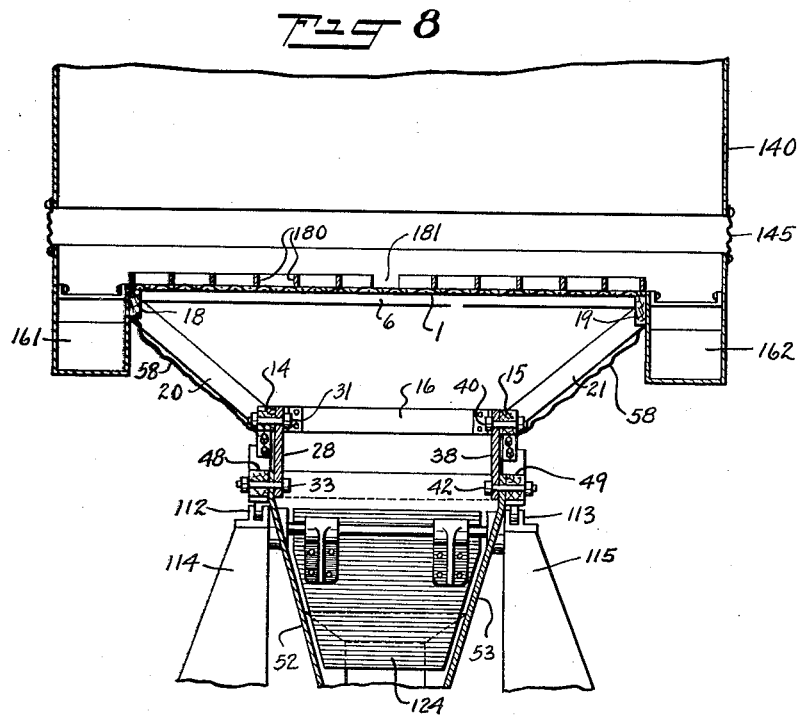
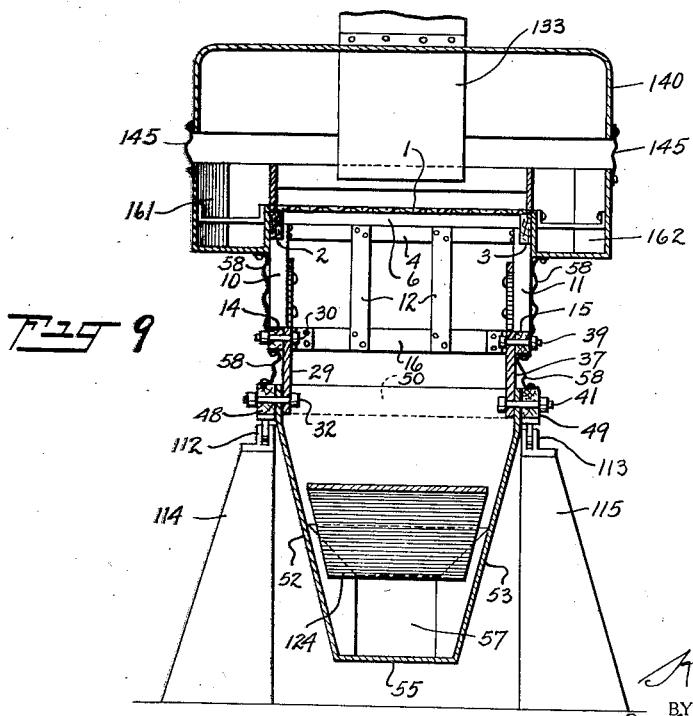
INVENTOR
K. Davis
BY
John D. Morgan
ATTORNEY Aug. 18, 1931.　　　K. DAVIS　　　1,819,995
MECHANISM AND PROCESS OF SEPARATING INTERMIXED DIVIDED MATERIALS
Filed May 21, 1924　　5 Sheets-Sheet 5
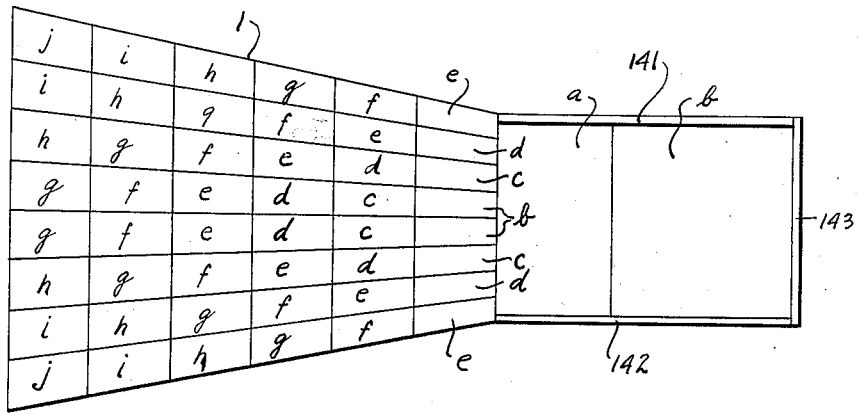
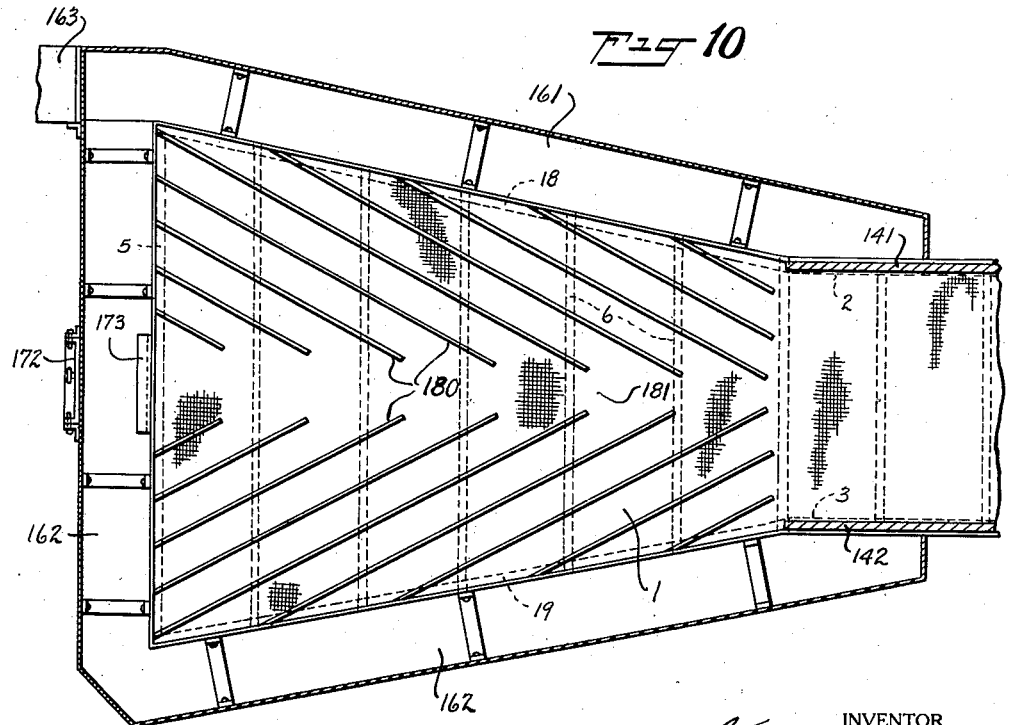
INVENTOR
K. Davis
BY
John D. Morgan
ATTORNEY Patented Aug. 18, 1931

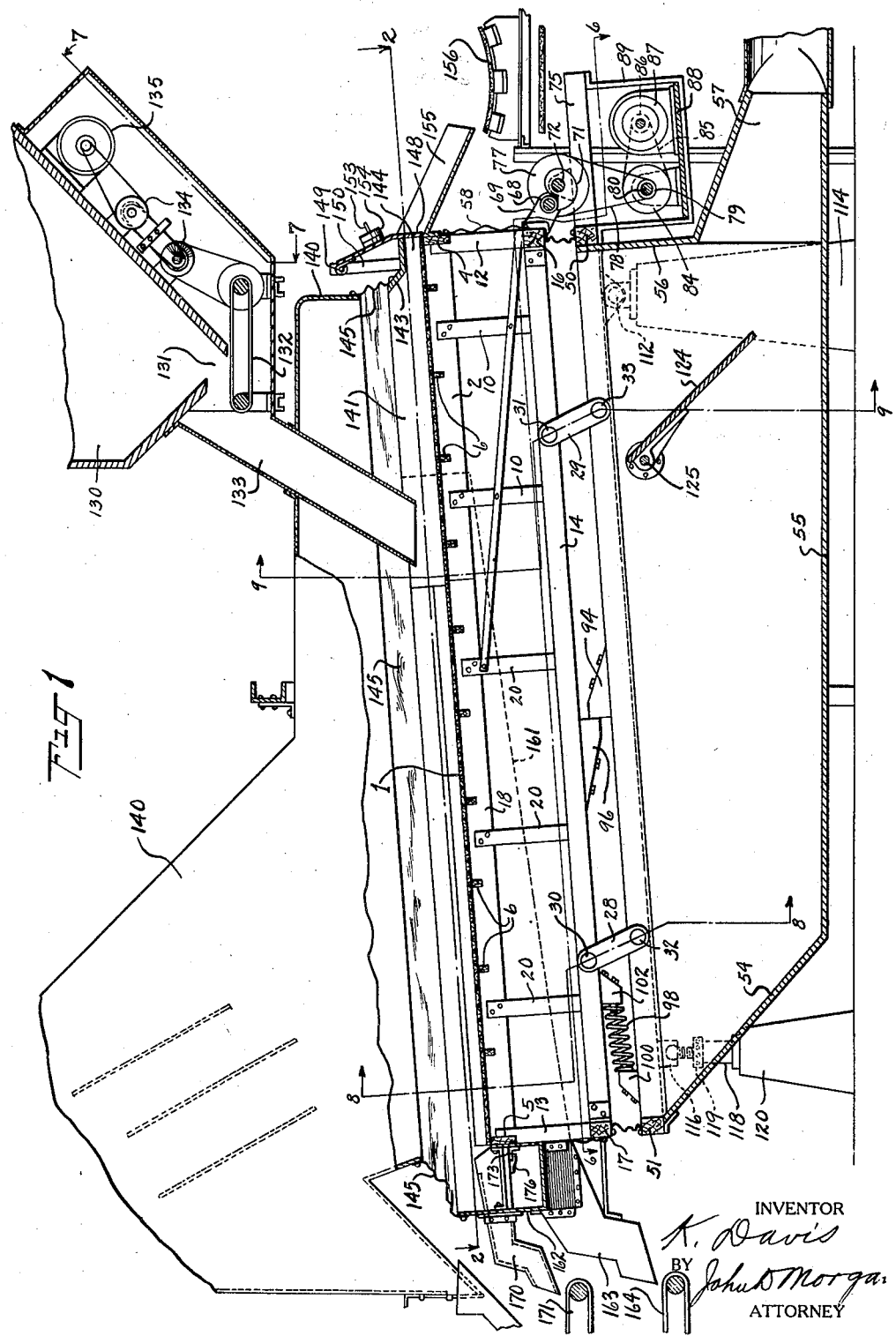

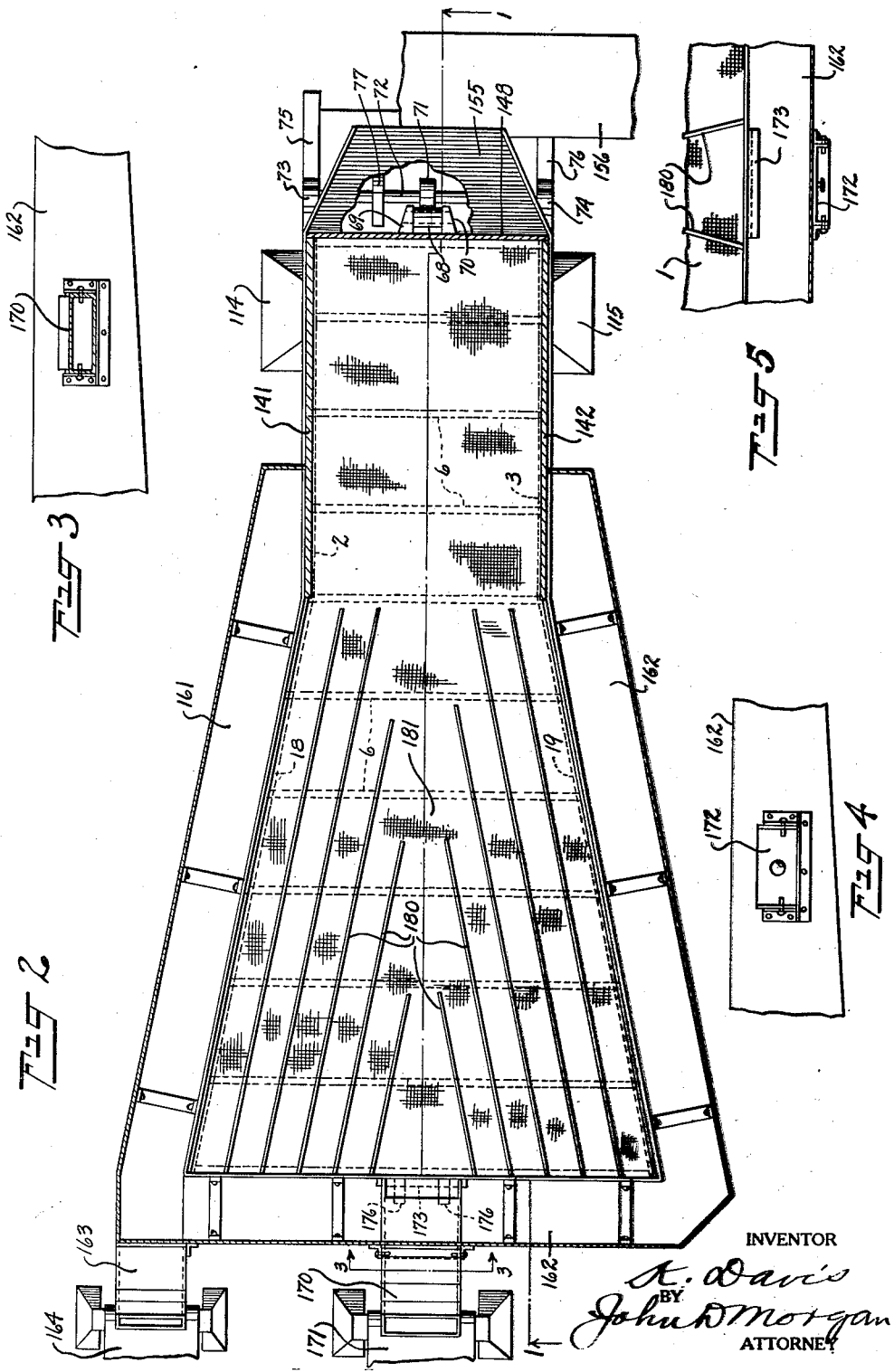

1,819,995

UNITED STATES PATENT OFFICE

KENNETH DAVIS, OF ST. BENEDICT, PENNSYLVANIA, ASSIGNOR, BY MESNE ASSIGNMENTS, TO PEALE-DAVIS COMPANY, OF WILMINGTON, DELAWARE, A CORPORATION OF DELAWARE

MECHANISM AND PROCESS OF SEPARATING INTERMIXED DIVIDED MATERIALS

Application filed May 21, 1924. Serial No. 714,916.

The invention relates to a novel machine and process for separating intermixed divided materials and for delivering the separated materials at different points, and more particularly in certain of its features to separating coal and rock in the mixtures usually coming from the mines.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel steps, processes sequences, parts, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a vertical longitudinal section, with certain parts in elevation, of a machine embodying the invention; the section being taken on line 1—1 of Fig. 2.

Fig. 2 is a full horizontal section taken on the line 2—2 of Fig. 1;

Fig. 3 is a fragmentary, transverse, vertical section, taken on the line 3—3 of Fig. 2;

Fig. 4 is a fragmentary elevation looking in the direction of the arrows in Fig. 3, but showing the chute of Fig. 3 removed and the opening therefor closed;

Fig. 5 is a fragmentary top plan corresponding to Fig. 4;

Fig. 6 is a full, horizontal section taken on the line 6—6 of Fig. 1;

Fig. 7 is an inclined section taken on the line 7—7 of Fig. 1;

Fig. 8 is a vertical, transverse section taken on the line 8—8 of Fig. 1;

Fig. 9 is a vertical, transverse, section taken on the line 9—9 of Fig. 1;

Fig. 10 is a fragmentary plan, corresponding to the rear end of Fig. 2 and to Figs. 4 and 5, and showing a different arrangement of separating partitions; and Fig. 11 is a diagrammatic plan of the distribution of air pressure through the airpervious table.

The invention relates to certain improved features and to certain novel features in a machine for separating intermixed divided materials, wherein a bed of material is substantially uniformly maintained upon an airpervious table, and subjected to the action of certain separating instrumentalities, including a transverse and preferably perpendicular air current through the bed, varying in intensity in different parts of the table, and mechanical propulsive movement of the table.

These machines are especially designed for rapidly, easily and very thoroughly separating intermixed divided materials wherein the materials themselves vary relatively very little in specific gravity, while the particles or fragments of material vary very greatly in size. With these conditions of the material, it is obviously a very difficult problem to effect practically complete separation of the intermixed materials.

An example of such intermixed materials, and one to which certain aspects or features of the present invention are especially addressed, is a mixture of coal and rock, or coal and rock and "bony" coming from many mines. Both the rock and coal particles vary in size from fine dust up to relatively large lumps, and the specific gravity of the rock and coal is relatively quite close. Where "bony" is also intermingled, it likewise varies greatly in size and its specific gravity lies between that of the coal and the rock.

In previous practice prior to my development of the present type of machine, certain of the difficulties of the problem of separation were overcome by preliminarily sizing and screening the intermixed materials, so as to separate them primarily into groups or masses of practically uniform sizes preparatory to separating the thus graded intermixed materials from each other. This procedure divided the problem into two parts, namely, first, separating according to sizes and then in these various preliminary groups of uniform sizes the separation of the different materials from each other.

This involved the expensive screening or sizing operation, and as the divisions or classifications according to sizes were very close, especially in the smaller dimensions (frequently extending to eighths of an inch or less), it was necessary to install and use a great many sizing machines. For instance, if the classification was into ten sizes, nine screening or sizing machines and operations would be necessary. Furthermore, a separating machine would be required for each group or class of the sized materials, thus necessitating, in the supposed example, ten different sizing machines.

By my invention the entire tedious, troublesome and costly sizing operations are avoided, and also the entire costly and cumbersome sizing plant is done away with. Furthermore, instead of a large number of separating machines, corresponding to the various classes or groups of sized materials, one machine does the entire work of separating. In practical work with certain kinds of intermixed coal, rock and "bony", all sizes from two and a half or three inches down to the finest dust are successfully separated.

The present preferred exemplary embodiment in its broader features comprises an air-pervious table, preferably flat, and inclined forwardly and upwardly, the intensity of the air currents through the different parts of the table being proportioned and regulated to correspond to the desired or required separating action at that part of the table. The table is also longitudinally reciprocated, the reciprocation at its forward end terminating preferably in a sharp impact.

The forward part of the table (this term being used for convenience and more or less arbitrarily to indicate the right-hand end of Figs. 1 and 2 or the discharge end for the heavier material), is preferably open and unobstructed and has greater longitudinal than transverse extent. The rear part of the table expands outwardly and rearwardly, and is provided with a plurality of separating partitions, which act successively to separate that portion of the materials which may still be intermixed.

These separating partitions are preferably arranged in symmetrical groups at either side of the longitudinal axis of the table, and are preferably perpendicular to the table and parallelly arranged in their groups, and likewise preferably in pairs at the opposite sides of the table. The separating partitions diverge from the central longitudinal axis of the table outwardly and rearwardly, and are preferably parallel to the corresponding side edges of the table. They also terminate short of the central axis of the table, thereby leaving an unobstructed passageway along the central part of the table.

Means are provided for feeding intermixed materials to the table so as to maintain the bed of materials undergoing separation substantially continuously uniform, and the materials are preferably fed onto the table near the rear of the forward or unobstructed portions thereof.

It will be understood that the foregoing general description and likewise the following detailed description are exemplary and explanatory of the invention, but are not restrictive thereof.

Referring now in detail to the embodiment of the invention illustrated by way of example in the accompanying drawings, a table 1 is provided of suitable air-pervious material, such as wire gauze, or perforate metal plates, the table being preferably flat. The table is supported upon a frame having side reaches 2 and 3 and ends 4 and 5, there being intermediate, transversely-disposed supports 6, extending across between the side frames 2 and 3 engaging the under side of the table to support it. The frame just described is supported on a series of uprights 10 and 11, at either side, and 12 and 13 at either end, these uprights resting on a lower frame having side reaches 14 and 15, and end reaches 16 and 17. This frame reciprocates with the table.

The rear end or gradually widening part of the table, has the side reaches 18 and 19 of the frame extending rearwardly and outwardly from the frame members 2 and 3, and the supports between these and the frame members 14 and 15 indicated by numerals 20 and 21, are upwardly and outwardly inclined.

The embodied form of means for longitudinally reciprocating the table 1 and for providing the impact at the forward end thereof, comprises supporting arms 28 and 29, at one side of the machine, pivotally connected at their upper ends 30 and 31, respectively, to the frame member 14; and at their bottom ends 32 and 33, respectively, to the top frame of the stationary (but angularly positionable) air chamber.

The corresponding structure on the other side comprises arms 37 and 38, these being pivoted at their upper ends 39 and 40, respectively, to the frame member 15 of the table, and at their bottom ends 41 and 42, respectively, to the opposite top frame of the air chamber.

The air chamber comprises a top frame having side reaches 48 and 49, and end reaches 50 and 51. Fixed to this frame, and extending downwardly therefrom, are downwardly and inwardly inclined side-walls 52 and 53, and a rear inwardly and downwardly inclined side wall 54, the chamber having a flat bottom 55, and a vertical from wall 56. At its forward end, the chamber opens into an air passage 57 through which the air under pressure from a blower or other suitable source is supplied. A flexible envelope of canvas or other air-pervious material 58 incloses the frame work of the table, and the space between the table and air chamber, and is connected air-tight to the top of the air chamber.

Further in the embodied form of said means, a cam roller 68 is rotatably mounted in arms 69 and 70 at the forward end of the table frame. Cooperating with the cam roller is a cam 71, fixed on a shaft 72, which shaft is journaled at 73 and 74 on extensions 75 and 76 of the side-frames of the air chamber. Fixed on shaft 72 is a pulley 77, over which runs a belt 78, the belt also running over a small pulley 79 on a shaft 80, journaled in bearings 81 and 82. Fixed on shaft 80 is a large pulley 84, over which runs a belt 85, which belt also runs over a pulley 86 on the shaft of the motor 87. The foregoing mechanism is mounted on a base 88, carried by hangers 89 from the frame members 75 and 76.

A pair of stops 94 and 95, respectively, are fixed to, and project upwardly from, the side reaches of the air chamber frame, and cooperating stops 96 and 97 project downwardly from the underside of the table supporting frame. At either side, helical springs 98 and 99 are in tension, respectively, between blocks 100 and 101 on the air chamber frame and blocks 102 and 103 on the underside of the table-supporting frame.

Thus, the table has a relatively slow and very slightly downwardly longitudinal, rearward movement, followed by a relatively sudden and slightly rising forward movement, terminating in a sharp impact. The purpose of this movement is the propulsion of the settled and heavier material on the table along the table toward the place of discharge.

Means are provided for varying the inclination of the table, and for this purpose the air chamber frame at the forward end thereof has pivotal mountings 112 and 113 upon corresponding pillars 114 and 115. This frame at the rear end thereof has ball-and-socket mountings 116 on corresponding screw posts 118, which are in turn carried upon supports 120 and 121. By turning nuts 119 on the screw posts 118 the structure may be raised and lowered about the pivots 112 and 113 to vary the inclination of the table.

Means for controlling and varying the air current action, or rendering it uniform, are provided as required, and this means, as embodied, comprising adjustable or positionable baffles 124 pivotally or otherwise movably supported. As shown, one baffle 124 is provided in the air chamber, having a pivotal mounting 125 in the walls thereof. It will be understood that any desired number of these baffles may be used either in the air chamber or directly beneath the table 1.

In the embodied form of means for feeding the intermixed material to the table, a hopper 130 is provided, having a discharge opening 131 in the bottom thereof, and thereneath a variable speed conveyor belt 132. This belt discharges the material in nicely regulable quantity into a chute 133, which discharges onto the rear portion of the forward part of the table. The variable speed drive for the conveyor belt 132 may be of any known or suitable form, and is shown generally at 134, being driven by a motor 135. It is shown as comprising a pair of conical pulleys 136 and 137, over which runs a belt 138, which is shiftable longitudinally of the pulleys by a belt shifter 139. This is standard equipment and the particular form thereof constitutes no part of the present invention.

Suitable dust-collecting means are provided, and such means are shown generally at 140, and may be the same as that shown in my copending application Ser. No. 612,456, filed Jan. 13, 1923, and need not be described herein in detail.

The rock or other heavier material is discharged at what may for convenience be termed the front end of the machine, that is, the right hand end in Figs. 1 and 2. Means are provided by the invention for regulating the discharge of such heavier material, so that the material will be discharged intermittently after it has accumulated so as to exert a certain pressure. In connection therewith, means are provided for exerting a backward and upward air current and air pressure to throw back any particles of coal or other lighter material which may reach this end of the table.

As embodied, the forward end of the table is provided at either side thereof with upwardly-projecting side walls 141 and 142, and at the front end with a cross cover plate 143. These constitute a somewhat shallow discharge passage 144, extending across at the front end of the machine for the heavier material. A flexible air-pervious envelope 145 of canvas or other suitable material makes a flexible air-tight connection between the walls of the table and the bottom edge of the dust collector 140.

The passageway 144 is normally closed by a gate 148, pivotally hung at 149 on a rod carried on standards 150, mounted on the table frame or casing. Means for varying the action of the gate 148 comprises a pin 153 projecting from the gate, upon which one or more weights 154 may be placed for the purpose described. A chute 155 conveys the discharged rock on to an endless conveyor 156.

The coal or other lighter material is discharged from the rear portion of the table, over the rearwardly and outwardly diverging side edges and over the rear end as well. Suitable receiving means for the separated and discharged coal are provided comprising chutes 161 and 162 at either side, hung from the edges of the table and inclining downwardly and rearwardly at a much sharper angle than the table. The chute 162 is continued along the rear edge of the table, and both chutes terminate in a discharge chute 163 which discharges on to a conveyor belt 164. The edges of the flexible envelope 145 are also connected air-tight to the upper edges of the conveyor chute.

Means are provided which may be optionally utilized to deliver an intermediate product, such as the "bone" at the center and rear of the machine. For this purpose there is provided a removable chute 170, which discharges onto an endless conveyor 171. The rear wall of the chute 160 is provided with a door 172, and on the inner wall of this chute is a ledge or lip 173. This door is closed when this chute 170 is not in use. When the chute is to be used, the door 172 is removed and the chute is slid inwardly through the opening and is provided on the bottom side thereof with one or more fingers 176, which pass beneath the ledge 173 and hold the chute in position. This chute will then deliver any material which is discharged backwardly down the central passageway of the table 1. The chute is shown in use in Fig. 2, while in Fig. 10 the door 172 is shown in position, the chute not being in use.

The separating partitions 180, on the table 1, begin preferably at or near the rear of the front portion of the table, and also preferably close to the point of feed of the intermixed materials. The separating partitions are in two groups at either side of the table, and those in each group are preferably parallelly arranged. The spaces therebetween are open toward the forward portion and toward the central axis of the table, and at either side they diverge outwardly and backwardly along the table. The outside pairs open directly into the rear end of the front portion of the table and the inner pairs open onto a central, longitudinally-disposed passageway 181 formed by the partitions terminating short of the longitudinal center line of the table. The partitions in Fig. 2 are parallel to the side edges of the rear part of the table.

In Fig. 10 a different arrangement of the separating partitions 180 is shown, wherein they are of greater outward and rearward inclination than the side edges of the rear portion of the table, and they discharge over the side edges of the table as well as over the rear edge thereof.

The air pressure, or the intensity of air currents, through the different parts of the table is varied so as to best effect that part or stage of the separating action which occurs at any particular location on the table. In Fig. 11 is shown diagrammatically one of the present preferred arrangements of gradated or zoned air pressure. The intensity of the air current or air pressure in each particular zone or area is indicated by the letters of the alphabet in decreasing series, that is, the letter $a$ represents the area of greatest air-current intensity, the letter $b$ indicates the next lesser degree of air-current intensity, and so on. The general arrangement, as now preferred, comprises an area of greatest air current intensity at the point of feeding in the intermixed divided materials, the air pressure decreasing forwardly along the table toward the discharge for the heavier material. The air pressure likewise decreases from the place of feeding on the intermixed materials both rearwardly and outwardly on the rear portion of the table. One such general arrangement is shown, as stated, in Fig. 11 but it will be understood, of course, that this arrangement may be widely varied.

The manner of operation of the mechanism just described is substantially as follows:—

The mechanism may be regarded as in operation, and with a bed of the materials resting upon the table 1, and the materials being in different degrees or stages of separation in different parts of the table. The intermixed materials are fed on to the table at such rate as to maintain the bed of materials substantially uniform, that is, the materials are fed on at about the separating capacity of the machine.

The materials are fed on, preferably at the rear portion of the forward end of the table 1, that is, close to the juncture of the forward and rear parts of the table. The relatively violent air action at this point acts to either float, or to project upwardly, most of the lighter material, while the largest and heaviest pieces of the heavier material sink immediately to rest on the bed 1. This energetic air action also tends to separate all the pieces or particles of the materials out of contact, thereby greatly facilitating and expediting the stratification and separation of the two materials.

It is likely that the energetic air action at this point will not only float and impel upwardly the lighter material, but also the smaller pieces of the heavier material. The pieces of the heavier material which have come to rest upon the table 1, are projected forwardly toward their place of discharge both by their inertia and their frictional engagement with the table 1 during the longitudinal reciprocation of the table and the impact with which the forward movement terminates. The air current after passing upwardly through the bed of materials is swept or deflected rearwardly and up into the dust collector.

The trend of the lighter particles, that is, of the separated lighter material and the smaller pieces of the intermixed materials is rearwardly along the table. Owing to the gradually decreasing intensity of the air currents both rearwardly and also outwardly, as just explained, the next heavier pieces or particles, that is, the successively smaller pieces of rock come to rest upon the table in one or the other of the zones of varying air intensity. As soon as the rock comes to rest upon the table, it is projected forwardly to the right in Fig. 2 by the reciprocatory motion of the table and by its impact, by reason of the inertia of the rock or other heavier material and its frictional engagement with the table. Thus, before the edges or the rear of the table is reached even the dust of the rock will have settled upon the table. Thus, not only is the settled-out heavier material propelled forwardly but the separating partitions also constrain it to travel inwardly.

It will therefore be seen that the heavier materials travel up the table to discharge at one end, while the lighter materials travel down the table, to discharge at the other end, some of the materials travelling slightly outwardly of the table to discharge at the sides thereof. The paths of travel of the heavier materials, and those lighter materials which discharge at the left hand end of the table in Fig. 2 or Fig. 10, are about 180° apart. The paths of travel of the heavier materials, and those lighter materials which discharge over the sides of the table, are more than 90° and a little less than 180° apart.

In connection with the foregoing, there is at each of the separating partitions a separating action of its own on such portion of still intermixed materials as reaches it. Back of each partition the air current is blowing upwardly, and the coal or other lighter material is floated over the separating partition, but the rock, or at least the remaining pieces of rock of certain size sink behind the separating partition, and then are impelled forwardly and inwardly toward the place of discharge as already described. The continued action of the air currents upon the now separated coal is upwardly and rearwardly and partly outwardly, and the coal is thereby impelled over the side edges and over the rear edge of the table into the delivery chute.

When "bony" is present in the coal, and the machine and especially the air pressure is regulated therefor, the "bony" may be discharged through the chute 170.

The probable action is that the "bony" is partly floated by the air behind each separating partition, but is too heavy to pass over the tops of the partitions with the clean coal, but on the other hand is too light under the circumstances to fall upon the table. In such case, the separating partition and the mechanical action of the table would propel the "bony" inwardly and forwardly until it passed the end of the separating partition, and thereafter, the mechanical action of the table would cease because of the absence of the separating partitions, and the air action, preventing the "bony" resting upon the table, its natural course would be rearwardly and downwardly along the center of the table to be discharged from the rear end thereof.

The rock or other heavier material will gradually be accumulated forwardly upon the front of the table and in the passageway 144 with gradually increasing pressure. At the same time the relatively strong air currents at this part of the table are projected upwardly and rearwardly, and any particles of coal which have found their way here would be projected upwardly and backwardly away from the discharge opening. When the pressure is sufficient to open the gate 148, the rock is projected forth into the chute 155 and on to the conveyor belt 156. This intermittent release of the pressure will also increase the intensity of the air currents upwardly and backwardly and will thus guard against any discharge of coal along with the rock.

It will be understood that the terms "lighter" and "heavier" materials refer to their relative specific gravities and not to the difference in mass of different pieces or particles.

The invention in its broader aspects is not limited to the exact mechanisms and constructions herein shown and described, nor to the precise manner of carrying out the process; as departures may be made therefrom within the scope of the accompanying claims without departing from the principles of the invention or sacrificing its chief advantages.

What I claim is:—

1. A mechanism for separating intermixed divided materials of different specific gravities including in combination an air-pervious table having longitudinally thereof an unobstructed portion and a portion having separating partitions thereon and means for progressing the separated materials, in substantially diametrically opposite directions along the table according to their respective specific gravities.

2. A mechanism for separating intermixed divided materials of different specific gravities including in combination an air-pervious table having longitudinally thereof an unobstructed portion and a portion having vertically disposed separating partitions thereon and means for delivering the intermixed materials to a point upon the table between the front and rear ends thereof.

3. A mechanism for separating intermixed divided materials of different specific gravities including in combination an air-pervious table having longitudinally thereof an unobstructed portion and a portion having separating partitions thereon, means for delivering the intermixed materials close to the juncture of said two portions of the table means for stratifying the materials into inferior and superior strata according to the differences in their specific gravities and for moving the strata longitudinally of the table in opposite directions.

4. A mechanism for separating intermixed divided materials of different specific gravities including in combination an air-pervious table having longitudinally thereof an unobstructed portion and a portion having separating partitions thereon and means for progressing the separated materials longitudinally of the table in opposite directions from the point of feed, and means for reciprocating the table longitudinally.

5. A mechanism for separating intermixed divided materials of different specific gravities including in combination an air-pervious table having longitudinally thereof an unobstructed portion and a portion having separating partitions thereon which diverge in the direction of travel of the lighter materials, means for delivering the intermixed materials to a median point longitudinally of the table, and means for reciprocating the table longitudinally whereby the materials are stratified and the strata moved in opposite directions from the point of feed substantially parallel to the direction of reciprocation to discharge at opposite ends of the table.

6. A mechanism for separating intermixed divided materials of different specific gravities including in combination an air-pervious table the perviousness of which progressively decreases toward the discharge for the lighter materials, the table, having longitudinally thereof an unobstructed portion and a portion having transversely disposed separating partitions thereon, means for progressing the separated heavier and lighter materials respectively in opposite directions along the table.

7. A mechanism for separating intermixed divided materials of different specific gravities including in combination an air-pervious table having longitudinally thereof an unobstructed portion and a portion having transversely disposed, divergent separating partitions thereon, means for feeding the intermixed materials onto the table at a point between the points of discharge for the light and heavy materials, and means for progressing the separated materials in opposite directions from the place of feed.

8. A mechanism for separating intermixed divided materials of different specific gravities including in combination an air-pervious table the perviousness of which decreases progressively toward the place of discharge for the lighter materials, the table having longitudinally thereof an unobstructed portion and a portion having transversely disposed separating partitions thereon, means for progressing the separated materials longitudinally of the table in opposite directions from the point of feed, and means for reciprocating the table longitudinally.

9. A mechanism for separating intermixed divided materials of different specific gravities including in combination an air-pervious table having longitudinally thereof an unobstructed portion and a portion having transversely disposed, divergent separating partitions thereon, means for feeding the intermixed materials onto the table at a point between the discharges for the light and heavy materials, means for progressing the separated materials along the table in opposite directions from said point, and means for reciprocating the table longitudinally.

10. A mechanism for separating intermixed divided materials of different specific gravities including in combination an inclined air-pervious table having longitudinally thereof an unobstructed portion and a portion having transversely disposed divergent separating partitions, projecting upwardly from the surface of the table, means for delivering the intermixed materials to a median point longitudinally of the table, and means for reciprocating the table longitudinally whereby the materials are stratified and the strata move up and down the table to points of discharge on opposite sides of said median point.

11. A mechanism for separating intermixed divided materials of different specific gravities including in combination an upwardly and forwardly inclined air pervious table, the forward part thereof being unobstructed and the rear part thereof having a plurality of parallelly arranged separating partitions thereon, means for longtiudinally reciprocating the table and means for feeding the intermixed materials onto the table at a point near the middle thereof, the several parts cooperating to cause the light and heavy materials to stratify, and to travel in opposite directions, respectively away from the place of feed.

12. A mechanism for separating intermixed divided materials of different specific gravities including in combination an air-pervious table having longitudinally thereof an unobstructed portion and a portion having a plurality of parallelly and divergently disposed separating partitions thereon, means for delivering the intermixed materials to a median point upon the table, the separating partitions being positioned to provide an unobstructed passageway centrally therebetween along the table and means for vibrating the table, whereby the lighter and heavier materials are stratified, and are caused to move in opposite directions to places of discharge on opposite sides of said median delivery point.

13. A mechanism for separating intermixed divided materials of different specific gravities including in combination an air-pervious table having longitudinally thereof an unobstructed portion and a portion having separating partitions thereon, means for progressing the heavier and lighter separated materials respectively in opposite directions along the table to discharge on opposite sides of the point where the intermixed materials are delivered onto the table, and means for reciprocating the table longitudinally, the separating partitions being positioned to provide an unobstructed passageway centrally therebetween along the table.

14. A mechanism for separating intermixed divided materials of different specific gravities including in combination an air-pervious table having longitudinally thereof an unobstructed portion and a portion having transversely disposed, separating partitions thereon diverging in the direction of flow of the lighter materials, and means for progressing the heavier and lighter separated materials respectively in opposite directions along the table, the separating partitions being positioned to provide an unobstructed passageway centrally therebetween along the table.

15. A mechanism for separating intermixed divided materials of different specific gravities including in combination an upwardly and forwardly inclined air pervious table, the forward part thereof being unobstructed, transversely disposed divergent separating partitions upon the rear part of the table, means for feeding the intermixed materials onto the table near the middle thereof, and means for longitudinally reciprocating the table whereby the heavy and light materials are progressed up and down the table, to places of discharge at opposite sides of the place of feed of the materials onto the table.

16. A mechanism for separating intermixed divided materials of different specific gravities including in combination an upwardly and forwardly inclined air pervious table, the perviousness of which decreases progressively toward the places of discharge for the lighter materials the forward part thereof being unobstructed, transversely disposed divergent separating partitions upon the rear part of the table, and located to provide a central passageway therebetween along the table, means for feeding the intermixed materials onto the table between the ends thereof, and means for longitudinally reciprocating the table whereby the separated materials are discharged at points on opposite sides of the point of feed.

17. A mechanism for separating intermixed divided materials of different specific gravities including in combination an upwardly and forwardly inclined air pervious table having a substantially central feed, and having discharge means for the separated materials on oposite sides of said feed, the forward part thereof being unobstructed, transversely disposed divergent separating partitions upon the rear part of the table, and located to provide a central passageway therebetween along the table, and means for longitudinally reciprocating the table and terminating the reciprocation by impact, whereby the materials are stratified and moved in substantially opposite directions away from said central feed.

18. A mechanism for separating intermixed divided materials of different specific gravities including in combination an air-pervious table having longitudinally thereof an unobstructed portion and a portion having transversely disposed separating partitions thereon, means for feeding the intermixed materials onto the table at a point between the front and rear ends thereof, means for progressing the lighter and heavier separated materials respectively along the table in opposite directions from the point of feed, and means located at the sides of the table for receiving therefrom the separated lighter material.

19. A mechanism for separating intermixed divided materials of different specific gravities including in combination an air-pervious table having longitudinally thereof an unobstructed portion and a portion having transversly disposed, separating partitions thereon diverging in the direction of flow of the lighter materials, means for progressing the separated materials in opposite directions longitudinally of the table, and means located at the sides of the table for receiving therefrom the separated lighter material.

20. A mechanism for separating intermixed divided materials of different specific gravities including in combination an air-pervious table having longitudinally thereof an unobstructed portion and a portion having transversely disposed separating partitions thereon diverging in the direction of flow of the lighter materials, means for progressing the lighter and heavier separated materials respectively in opposite directions along the table, means for reciprocating the table longitudinally, and means located at the sides of the table for receiving therefrom the separated lighter material.

21. A mechanism for separating intermixed divided materials of different specific gravities including in combination an air-pervious table having longitudinally thereof an unobstructed portion and a portion having transversely disposed, separating partitions thereon diverging in the direction of flow of the lighter materials, means for feeding the intermixed materials onto the table at a point between the discharge points for the light and heavy materials, means for progressing the separated materials in opposite directions along the table, means for reciprocating the table longitudinally, and means located at the sides of the table for receiving therefrom the separated lighter material.

22. A mechanism for separating intermixed divided materials of different specific gravities including a combination an air-pervious table having longitudinally thereof an unobstructed portion and a portion having separating partitions thereon, means for feeding the intermixed materials onto the table at a point toward the middle thereof, means for progressing the lighter and heavier separated materials respectively along the table in opposite directions from the point of feed, the separating partitions being positioned to provide an unobstructed passageway centrally therebetween along the table, and means for receiving separated material from said passageway at the rear of the table.

23. A mechanism for separating intermixed divided materials of different specific gravities including in combination an air-pervious table having longitudinally thereof an unobstructed portion and a portion having tranversely disposed, separating partitions thereon diverging in the direction of travel of the lighter materials means for progressing the separated materials longitudinally of the table in opposite directions from the place of feed, the separating partitions being positioned to provide an unobstructed passageway centrally therebetween along the table, and means located at the side of the table for receiving therefrom the separated lighter material.

24. A mechanism for separating intermixed divided materials of different specific gravities including in combination an upwardly and forwardly inclined air pervious table, the forward part thereof being unobstructed and the rear part thereof having transversely disposed divergent separating partitions upon the table, means for longitudinally reciprocating the table means for feeding the intermixed materials onto the table at a point between the places of discharge for the light and heavy materials, and means located at the sides of the table for receiving therefrom the separated lighter material.

25. A mechanism for separating intermixed divided materials of different specific gravities including in combination an upwardly and forwardly inclined air pervious table, the forward part thereof being unobstructed and the rear part thereof having thereon, diverging in the direction of travel of the lighter materials, means for feeding the intermixed materials onto the table at a point between the places of discharge for the light and heavy materials and means for longitudinally reciprocating the table, and means located at the sides of the table for receiving therefrom the separted lighter material.

26. A mechanism for separating intermixed divided materials of different specific gravities including in combination an air pervious table having an unobstructed portion extending from one end to a median section and the remaining portion having separating partitions thereon, means for feeding intermixed divided materials at the median section, and means for moving the lighter material toward the separating partitions and the heavier material toward the unobstructed portion of the table.

27. A mechanism for separating intermixed divided materials of different specific gravities including in combination an upwardly and forwardly inclined air-pervious table, the forward part thereof being unobstructed and the rear part thereof having rearwardly and outwardly divergent separating partitions thereon, said partitions being located to provide a central passageway therebetween along the table, means for longitudinally reciprocating the table and terminating the reciprocation by impact, means for feeding the intermixed materials onto the table at a point between the ends thereof, whereby the heavier and lighter materials are progressed longitudinally of the table in opposite directions from said median point.

28. A process for separating intermixed divided materials which comprises supporting a bed of the materials on a longitudinally-inclined air-pervious support and subjecting the bed to lifting air currents and mechanical vibration, progressing flotant lighter material downwardly over the support to discharge from the lower portion thereof, and impelling settled heavier material laterally and upwardly along the support to discharge from the upper portion thereof.

29. A process for separating intermixed divided materials which comprises supporting a bed of the materials on a longitudinally-inclined, air pervious support and subjecting the bed to lifting air currents and mechanical vibration, discharging a material of one specific gravity along the two sides and one end of the support, and discharging a material of a different specific gravity at the other end of the support.

30. A mechanism for separating intermixed divided materials including in combination a longitudinally-inclined, air-pervious table, means for vibrating the table, means for maintaining a bed of materials on the table, means for discharging lighter material from the lower portion of the table, and means for directing settled heavier material laterally and upwardly of the table to discharge at the upper portion thereof.

31. A mechanism for separating intermixed divided materials including in combination a longitudinally-inclined, air-pervious table, means for vibrating the table, means for maintaining a bed of materials on the table means for discharging lighter material from the lower portion of the table, and means for directing settled heavier material laterally and upwardly of the table to discharge at the upper portion thereof, including separating partitions disposed diagonally of the longitudinal axis of the table.

In testimony whereof, I have signed my name to this specification.

KENNETH DAVIS.